(12) United States Patent
Thieben, Jr. et al.

(10) Patent No.: US 10,322,368 B2
(45) Date of Patent: Jun. 18, 2019

(54) CENTRIFUGAL AIR SEPARATOR COIL MANUFACTURING TOOLS AND METHODS

(71) Applicant: The Boeing Company, Chicago, IL (US)

(72) Inventors: Paul F. Thieben, Jr., Fountain Valley, CA (US); Robert French, San Marino, CA (US); John Suarez, Mission Viejo, CA (US)

(73) Assignee: The Boeing Company, Chicago, IL (US)

( * ) Notice: Subject to any disclaimer, the term of this patent is extended or adjusted under 35 U.S.C. 154(b) by 488 days.

(21) Appl. No.: 15/051,382

(22) Filed: Feb. 23, 2016

(65) Prior Publication Data

US 2017/0239616 A1    Aug. 24, 2017

(51) Int. Cl.
*B21D 11/06* (2006.01)
*B01D 53/24* (2006.01)
*B21D 9/05* (2006.01)
*B21D 9/15* (2006.01)

(52) U.S. Cl.
CPC ............ *B01D 53/24* (2013.01); *B21D 9/05* (2013.01); *B21D 9/15* (2013.01); *B21D 11/06* (2013.01); *B01D 2257/504* (2013.01); *B01D 2259/4566* (2013.01); *B01D 2259/4575* (2013.01)

(58) Field of Classification Search
CPC ... B21D 9/00; B21D 9/05; B21D 9/15; B21D 11/06; B21C 37/12; B21C 37/15; B21F 3/04; B01D 53/24
See application file for complete search history.

(56) References Cited

U.S. PATENT DOCUMENTS

| 1,046,851 A | | 12/1912 | Pratt | |
|---|---|---|---|---|
| 1,075,045 A | * | 10/1913 | Lewis | B21F 3/04 72/144 |
| 1,483,985 A | * | 2/1924 | Price | B21F 3/08 72/137 |

(Continued)

FOREIGN PATENT DOCUMENTS

GB          2277283 A  * 10/1994   ............... B21F 3/04

OTHER PUBLICATIONS

Canada Metal, "*Bending Thin-Walled Tubing, Moldings and Extruded Shapes*," Cerro Metal Products, date unkown.

*Primary Examiner* — Edward T Tolan
(74) *Attorney, Agent, or Firm* — DASCENZO Intellectual Property Law, P.C.

(57) ABSTRACT

Tightly-coiled helical ducts for centrifugal air separators may be formed with the tools and methods disclosed herein. A helical coil toolset includes a helically grooved mandrel and an entry block. The helical groove of the mandrel has a small helix inside diameter relative to a width of the helical groove. The entry block has a guide channel to guide a tube to the helical groove and a mandrel channel to receive the mandrel. Methods include forming tubing into a tightly-coiled helical duct by filling a tube with fine particles, positioning the tube in the helical groove of a helically grooved mandrel, fixing the tube relative to the mandrel, assembling an entry block around the tube and around the mandrel, and bending the filled tube around the helically grooved mandrel into the tightly-coiled helical duct by rotating the mandrel relative to the entry block.

20 Claims, 10 Drawing Sheets

(56) References Cited

U.S. PATENT DOCUMENTS

| | | | | |
|---|---|---|---|---|
| 2,525,093 A * | 10/1950 | Cahenzli, Jr. | ........ | B21D 11/06 |
| | | | | 72/142 |
| 3,074,465 A | 1/1963 | Huet | | |
| 3,970,233 A * | 7/1976 | Suchecki | ........ | B21C 37/15 |
| | | | | 228/17.5 |
| 4,056,373 A | 11/1977 | Rubin | | |
| 4,133,762 A | 1/1979 | Visceglia et al. | | |
| 4,424,624 A * | 1/1984 | Sievers | ........ | B21D 11/06 |
| | | | | 165/156 |
| 4,599,773 A | 7/1986 | Sievers | | |
| 4,783,981 A * | 11/1988 | Shahum | ........ | B21D 11/06 |
| | | | | 72/137 |
| 5,088,192 A * | 2/1992 | Dempsey | ........ | F28D 7/024 |
| | | | | 29/726.5 |
| 5,222,552 A * | 6/1993 | Schuchert | ........ | B21D 9/073 |
| | | | | 126/109 |
| 6,513,540 B2 * | 2/2003 | Erdei | ........ | B01J 4/001 |
| | | | | 118/715 |
| 6,716,269 B1 | 4/2004 | Graff et al. | | |

\* cited by examiner

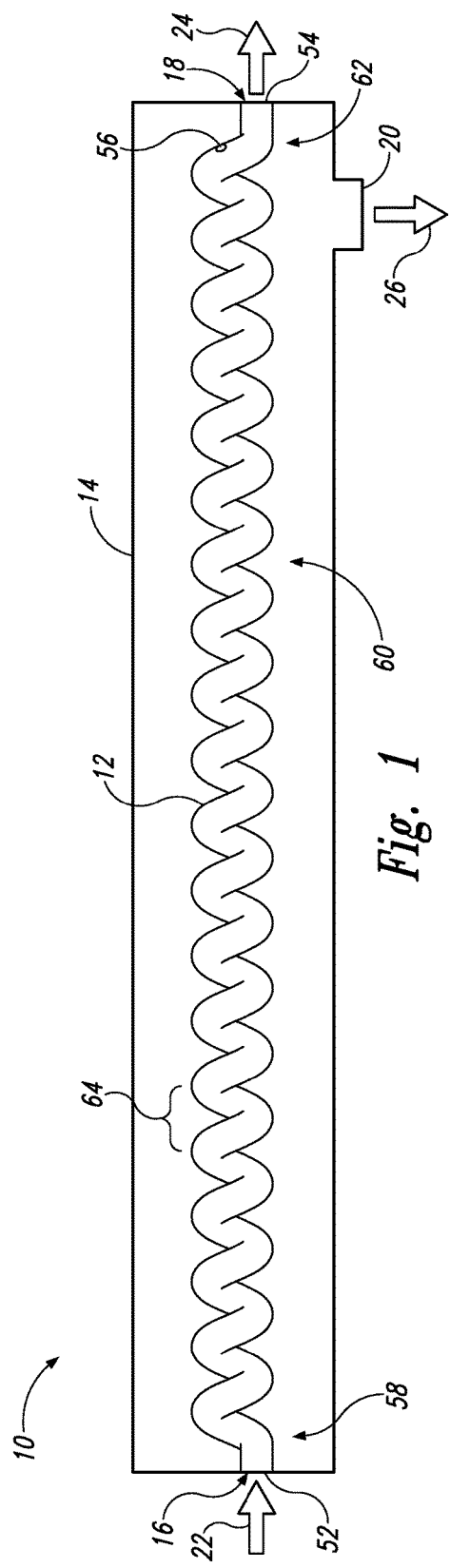
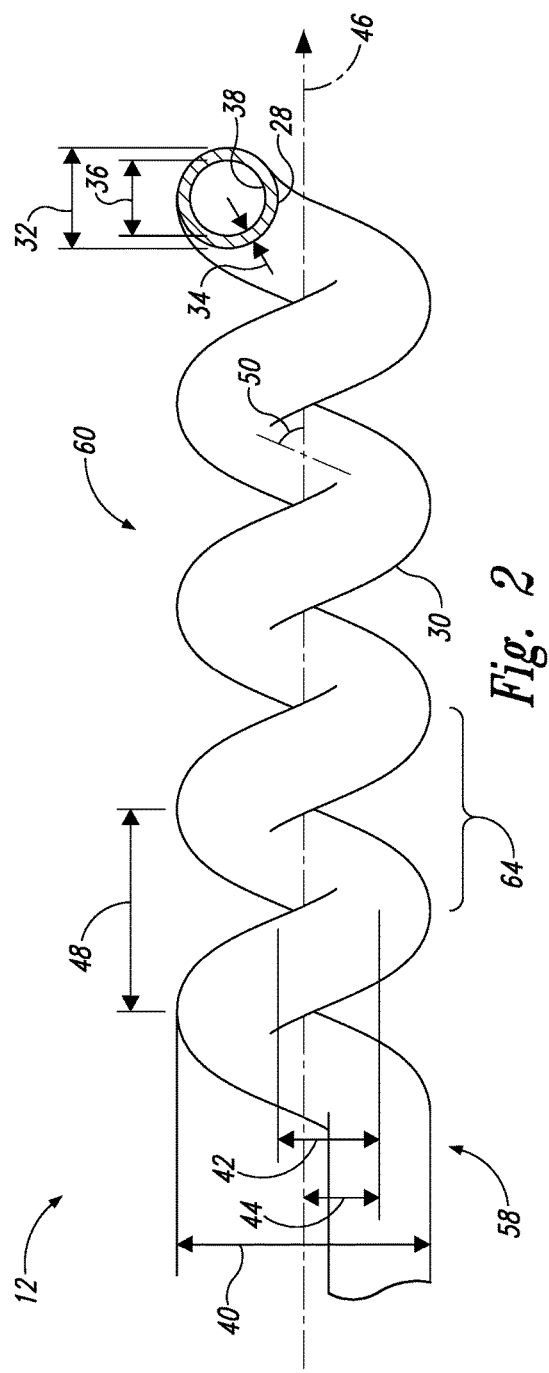
Fig. 1
Fig. 2

CENTRIFUGAL AIR SEPARATOR COIL MANUFACTURING TOOLS AND METHODS

FIELD

The present disclosure relates to manufacturing tools and methods to produce tightly-coiled helical ducts.

BACKGROUND

Purification of gases in air may be useful or vital in enclosed environments such as spacecraft, space habitats, submarines, underground mines, and terrestrial (e.g., aircraft, armored vehicles) and non-terrestrial vehicles (e.g., pressurized rovers). In particular, people produce carbon dioxide ($CO_2$) as a metabolic byproduct that can become noxious if accumulated within an enclosure. The average person exhales almost a kilogram (kg) of carbon dioxide per day. In environments containing higher levels of carbon dioxide, people may experience symptoms such as nausea, dizziness, and headaches. Hence, manned, enclosed environments need a mechanism to remove carbon dioxide produced within the environment. Additionally, animals and plants are sensitive to the level of carbon dioxide and would benefit from carbon dioxide control.

One proposed method of carbon dioxide control uses a new type of air separation based upon centrifugal stratification of an input air stream drawn from an enclosure's atmosphere. Centrifugal air separation separates flowing gas based on the molecular weight of the gas' constituents by passing the input gas through a tightly coiled duct. Centrifugal air separation is different than gas centrifugation which spins a quantity of input gas in a rotating cylinder to separate the gas components by molecular weight. In centrifugal air separation, the input gas flows at relatively high speed through a tightly coiled duct, causing the gas to follow the duct's coiled path (generally a helical path). As the gas travels along the coiled duct in a generally laminar manner, the input gas stratifies according to the molecular weight of the gas components. Carbon dioxide, being heavier than oxygen and nitrogen, can be separated by appropriately tapping the stratified gas stream. Generally, a centrifugal air separator may be used to separate an input gas stream into a heavy component gas stream (enriched in heavy gas components) and a light component gas stream (enriched in light gas components).

The coiled duct for centrifugal air separation generally has a small radius of curvature relative to the duct diameter and a smooth interior to reduce turbulence as the gas flows. For a coiled duct constructed of tubing, the radius of curvature of the tubing may be specified at about one times the outside diameter of the tubing. Conventionally, tube bending with a small radius of curvature (e.g., less than five times the tube diameter) risks wrinkling, cracking, and/or flattening the tube. For thin-wall metal tubing, a radius of curvature of about two times the tube's outer diameter is generally considered the limit to avoid damage to the tube integrity.

Hence, there is a need for systems and methods to form tightly coiled ducts for centrifugal air separation which can form the ducts without significant wrinkling, cracking, or distortion.

SUMMARY

Tightly-coiled helical ducts for centrifugal air separators may be formed with the tools and methods disclosed herein. The disclosed helical coil toolset includes a helically grooved mandrel and an entry block. The helically grooved mandrel has a helical groove with a helix inside diameter that is less than twice a width of the helical groove. The helical groove is sized to accept a portion of an outside circumference of a tube. The entry block has a guide channel and mandrel channel. The guide channel is sized to fit the outside circumference of the tube and to permit the tube to slide through. The guide channel has an exit that connects with the mandrel channel and the guide channel is configured to direct the tube into the helical groove of the helically grooved mandrel. The mandrel channel is configured to receive the helical groove of the helically grooved mandrel.

The disclosed methods of forming thin wall tubing into a tightly-coiled helical duct include selecting the thin wall tube, filling the thin wall tube with fine particles to form a filled tube, positioning a portion of the thin wall tube in a portion of a helical groove of a helically grooved mandrel, fixing a first section of the thin wall tube relative to the helically grooved mandrel, assembling an entry block around a second section of the thin wall tube and around the helically grooved mandrel, and bending the filled tube around the helically grooved mandrel. The portion of the thin wall tube in the portion of the helical groove is between the first section and the second section of the thin wall tube. Bending includes rotating the helically grooved mandrel relative to the entry block assembled around the thin wall tube and the helically grooved mandrel to form the tightly-coiled helical duct within the helical groove. The outside diameter of the tightly-coiled helical duct that is formed is less than four times the outside diameter of the thin wall tube.

BRIEF DESCRIPTION OF THE DRAWINGS

FIG. 1 is a schematic representation of a centrifugal air separator according to the present disclosure.

FIG. 2 is a side view of an example of a helical duct.

DESCRIPTION

Figure 3:
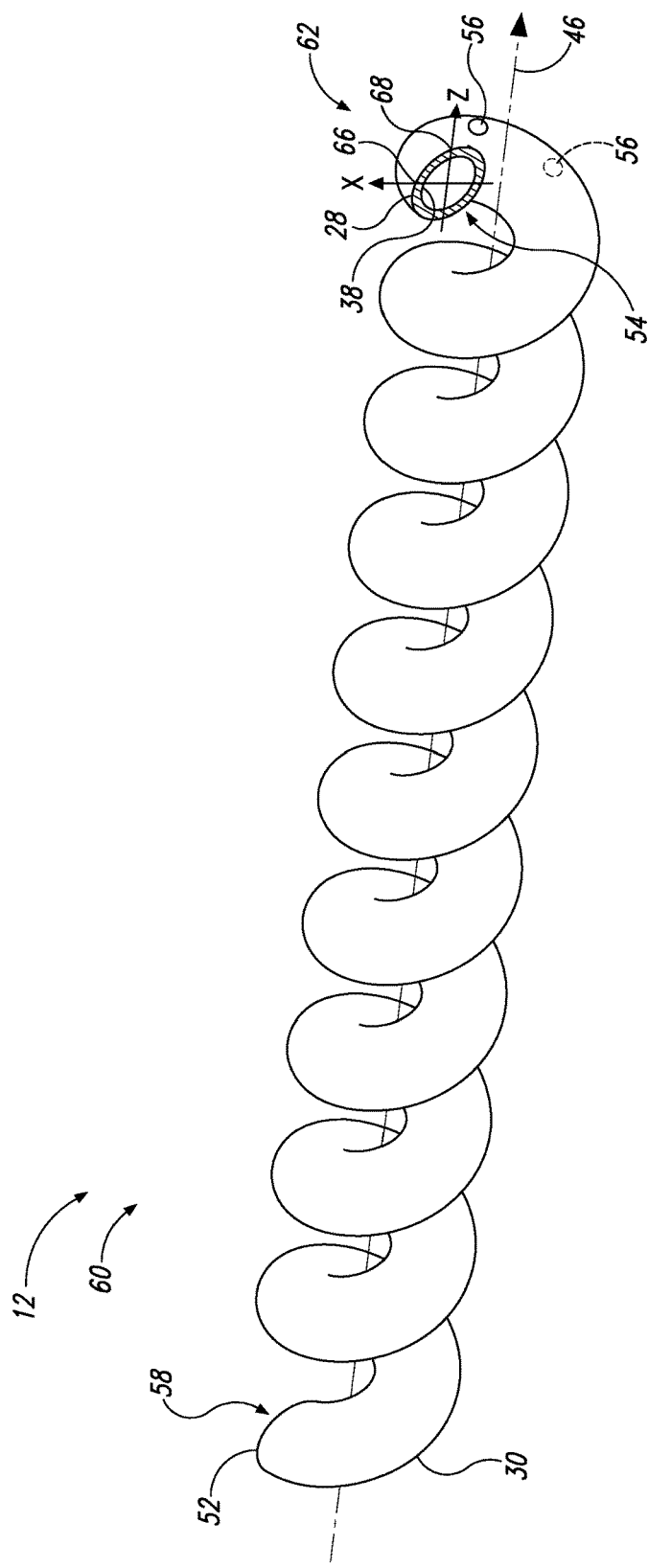
FIG. 3 is a perspective view of an example of a helical duct.

FIGS. 1-14 illustrate helical ducts and related devices, and helical duct manufacturing apparatuses and methods. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labelled with numbers consistent among the figures. Like numbers in each of the figures, and the corresponding elements, may not be discussed in detail herein with reference to each of the figures. Similarly, all elements may not be labelled or shown in each of the figures, but reference numerals associated therewith may be used for consistency. Elements, components, and/or features that are discussed with reference to one or more of the figures may be included in and/or used with any of the figures without departing from the scope of the present disclosure.

FIG. 1 is a schematic representation of a centrifugal air separator 10 that is configured to separate a gas stream flowing through a helical duct 12 (also referred to as a tightly coiled duct) into a light fraction stream and a heavy fraction stream. The centrifugal air separator 10 may be part of a life support system that removes carbon dioxide (relatively heavy) from a breathable atmosphere including oxygen (relatively light).

Centrifugal air separators 10 are configured to separate a gas stream (the input stream 22) flowing through the helical duct 12 into a light fraction stream and a heavy fraction stream according to the molecular weight of the components of the gas stream. The helical duct 12 is a tightly coiled duct that defines a helical flow path between an entrance port 52 and an exit port 54. Near the exit port 54, the helical duct 12 has at least one waste port 56. The input stream 22 flowing into the entrance port 52 of the helical duct 12 is separated by flow conditions and the geometry of the helical duct 12 into an output stream 24 at the exit port 54 that is generally depleted (relative to the input stream 22) of higher molecular weight components and a waste stream 26 at the waste port(s) 56 that is generally enriched (relative to the input stream 22) in higher molecular weight components. The gas flow through the helical duct 12 is generally laminar and subject to centrifugal force as the gas follows the helical interior path. The laminar flow and centrifugal force stratifies the gas stream into the light fraction stream (e.g., depleted of carbon dioxide and/or enriched in oxygen) and the heavy fraction stream (e.g., enriched in carbon dioxide and/or depleted of oxygen).

The helical duct 12 may include an entrance section 58 that includes the entrance port 52, a loop section 60 (also called a coil section) that includes a series of loops 64 that define the helical flow path, and an exit section 62 that includes the exit port 54. The loop section 60 includes the waste port(s) 56.

Centrifugal air separators 10 include a separator entrance port 16 fluidically coupled to the entrance port 52 of the helical duct 12 and configured to accept the input stream 22, a separator exit port 18 fluidically coupled to the exit port 54 of the helical duct 12 and configured to emit the output stream 24 (the light fraction stream), and a separator waste port 20 fluidically coupled to the waste port(s) 56 of the helical duct 12 and configured to emit the waste stream 26 (the heavy fraction stream). Centrifugal air separators 10 may include a sheath 14 which encloses the waste port(s) 56 of the helical duct 12 and defines the separator waste port 20. Centrifugal air separators 10 may include a plurality of helical ducts 12 configured to operate in parallel and/or in series. In a parallel configuration, the entrance ports 52, the exit ports 54, and the waste ports 56 of the helical ducts 12 are fluidically coupled to the respective separator entrance port 16, separator exit port 18, and separator waste port 20. In a series configuration, the exit port 54 or the waste port 56 of at least one helical duct 12 is fluidically coupled to the entrance port 52 of at least one other helical duct 12.

The naming of the centrifugal air separator 10, the input stream 22, the output stream 24, the separator waste port 20, and the waste stream 26 is in accord with the use of the centrifugal air separator 10 in a life support system or similar system. These terms are used for consistency and clarity without implying a limitation on the use of the centrifugal air separator 10. Centrifugal air separators 10 are configured to separate gas and are not necessarily limited to separating air. Centrifugal air separators 10 also may be referred to as gas separators, gas purifiers, air separators, air purifiers (e.g., centrifugal air purifiers), air scrubbers (e.g., centrifugal air scrubbers), and/or carbon dioxide removal apparatuses (e.g., centrifugal carbon dioxide removal apparatuses). The input stream 22 is a gas stream that may be air from an environment but is not necessarily a stream of air. The input stream 22 also may be referred to as the input air stream and/or the mixed gas stream. The output stream 24 is the light fraction of gas output from the centrifugal air separator 10 and is not necessarily air with reduced carbon dioxide. The output stream 24 also may be referred to as the light fraction stream, the lower molecular weight output stream, the purified air stream, the purified stream, the clean air stream, and/or the primary output stream. The separator exit port 18, which is configured to emit the output stream 24, may be referred to as the light fraction port, the clean port, and/or the primary exit port. The waste stream 26 is the heavy fraction of gas output from the centrifugal air separator 10 and is not necessarily waste, impurities, contamination, undesired gas, or unused gas. The waste stream 26 also may be referred to as the heavy fraction stream, the higher molecular weight output stream, the bleed stream, and/or the secondary output stream. The separator waste port 20 is configured to emit the waste stream 26 and is not necessarily configured to emit waste, impurities, or contamination. The separator waste port 20 may be referred to as the heavy fraction port, the bleed port, and/or the secondary exit port. Without implying any particular use or limitation, ports and streams associated with other components are named according to their logical connection to entrance port 16, the input stream 22, the separator exit port 18, the output stream 24, the separator waste port 20, and/or the waste stream 26.

The helical duct 12 is configured to flow the input stream 22 through the helical duct 12 in a generally laminar manner, i.e., in a manner where the turbulence of the flow is low enough and/or directed (e.g., confined to particular layers and/or regions) to permit stratification of the gas stream in a direction perpendicular to the bulk gas flow. The generally laminar manner may be influenced by speed (e.g., velocity, mass flow rate) of the gas flow, gas parameters (e.g., pressure, temperature, and viscosity), the shape of the helical flow path, the interior profile of the helical flow path, changes in the interior profile, and the surface characteristics of the helical duct interior (e.g., surface roughness, surface features). Lower speeds, higher viscosity, and a smoother flow path tend to encourage reduced turbulence. However, higher speeds tend to increase the centrifugal force. Smaller dimensions tend to encourage reduced turbulence. Hence, the helical duct 12 may have a smooth interior with a consistent cross section and substantially no discontinuities, wrinkles, folds, and/or other internal protrusions.

FIGS. 2-3 illustrate at least a portion of a helical duct 12. The helical duct 12 is formed of a tube 30 with at least a loop section 60 (a series of loops 64) in the form of a helix. The helical duct 12 may include an entrance port 52 and/or an entrance section 58 at one end of the loop section 60 and may include an exit port 54 and/or an exit section 62 at the other end of the loop section 60.

As shown in FIG. 2, the tube 30 generally is a narrow, thin-wall tube with a wall thickness 34 that is a small fraction of the outside diameter 32 of the tube 30. For example, the outside diameter 32 may be less than 20 mm, less than 15 mm, less than 10 mm, greater than 1 mm, and/or greater than 2 mm. And, the wall thickness 34 may be less than 2 mm, less than 1 mm, greater than 0.1 mm, and/or greater than 0.2 mm. The ratio of the wall thickness 34 to the outside diameter 32 may be less than 15%, less than 10%, greater than 5%, and/or greater than 8%.

The tube 30 has a smooth interior profile 38 characterized by the inside diameter 36 of the tube 30. The interior profile 38 may be circular or substantially circular, but is not required to be circular. The interior profile 38 may be elliptical, ovate, and/or rounded. When the interior profile 38 is not circular, the inside diameter 36 refers to the effective diameter of the interior profile 38 (i.e., the diameter of a circle of equal area to the area of the interior profile 38). Generally, the interior profile 38 has a smooth finish to promote laminar flow a gas flow of at least 10 m/s (meters per second), at least 20 m/s, or at least 50 m/s. For example, the interior finish may have an average roughness of less than 50 μm (microns), less than 20 μm, less than 10 μm, less than 5 μm, or less than 2 μm.

The exterior profile 28 of the tube 30 generally mimics the interior profile 38, e.g., the wall thickness 34 is substantially uniform around the interior profile 38. Thus, the exterior profile 28 may be circular, substantially circular, elliptical, ovate, and/or rounded. When the exterior profile 28 is not circular, the outside diameter 32 refers to the effective diameter of the exterior profile 28.

The helix of the loop section 60 is characterized by a helix outside diameter 40, a helix inside diameter 42, a helix radius 44, a helix axis 46, a helix pitch 48, and a helix angle 50. The helix outside diameter 40 is the diameter of the cylinder that fits around the exterior dimensions of the tube 30 in the loop section 60. The helix inside diameter 42 is the diameter of the cylinder that fits through the central core of the loop section along the helix axis 46. Generally, the helix outside diameter 40, the helix inside diameter 42, and the helix radius 44 are centered around and measured relative to the helix axis 46. For a uniform helix and tube 30, the helix inside diameter 42 is two outside diameters 32 of the tube 30 less than the helix outside diameter 40. The helix radius 44 is the radius of curvature of the tube 30 in the loop section 60 perpendicular to the helix axis 46. The helix radius 44 is measured from the helix axis 46 to the center of the interior profile 38 of the tube 30. For a uniform helix and tube 30, the helix radius 44 is half of the helix inside diameter 42 plus half of the outside diameter 32 of the tube 30. With respect to the inside diameter of the tube 30, the helix radius 44 is half of the helix inside diameter 42 plus half of the inside diameter 36 of the tube 30 plus the wall thickness 34 of the tube 30. The helix pitch 48 is the distance along the helix axis 46 of a full revolution of the tube 30, i.e., the spacing between successive loops 64 in the loop section 60. The helix angle 50 is the angle of inclination of the tube 30 in the loop section 60 with respect to the helix axis 46. For a uniform helix, the tangent of the helix angle 50 is the helix radius 44 divided by one quarter of the helix pitch 48.

The loop section 60 is tightly coiled with numerous loops 64. The loops 64 are arranged in a smooth helix, generally with a uniform or smoothly varying helix radius 44 and/or curvature of the tube 30. The loop section 60 may include at least 5, at least 10, less than 50, and/or less than 100 loops 64. The helix radius 44 is small relative to the outside diameter 32 of the tube 30. Larger (looser) loops 64 and a larger helix radius 44 tend to contribute to smoother air flow through the loop section 60. Smaller (tighter) loops 64 and a smaller helix radius 44 tend to induce greater centrifugal force in the gas for a given flow rate. The helix radius 44 (the average helix radius 44 if the helix radius 44 is not uniform) may be less than 2, less than 1.5, less than 1, greater than 0.5, and/or greater than 0.8 times the inside diameter 36 of the tube 30. The corresponding helix outside diameter 40 may be less than 5, less than 4, less than 3, greater than 2, and/or greater than 2.5 times the outside diameter 32 of the tube 30. The corresponding helix inside diameter 42 may be less than 3, less than 2, less than 1, greater than 0, and/or greater than 0.5 times the outside diameter 32 of the tube 30. The helix pitch 48 may be less than 4, less than 3, and/or greater than 1 times the outside diameter 32 of the tube 30. The helix angle 50 may be less than 80°, less than 70°, greater than 30°, greater than 45°, and/or greater than 60°.

The entrance port 52 and the exit port 54 of the helical duct 12 are essentially open ends of the tube 30 that forms the helical duct 12. Hence, the sizes (cross sectional areas) of the entrance port 52 and the exit port 54 are substantially the same as the sizes of the interior profile 38 at the respective ends. The relative sizes of the entrance port 52, the exit port, and the waste port(s) 56 may be selected based upon the desired flow rates and/or the expected relative fraction of heavy components and light components within the input stream 22.

As shown in FIG. 3, waste port(s) 56 generally are apertures through the wall of the tube 30 near the exit end of the loop section 60 of the helical duct 12 (in the end region of the loop section 60 that is toward the exit section 62 and the exit port 54). The waste port(s) 56 may be in the last several loops 64 of the loop section 60, e.g., in a region spanning the last 1, 2, 3, 4, or 5 loops 64 and/or a region spanning the last 20%, 10%, or 5% of the total length of the helical duct 12.

The mass flow ratio of the output stream 24 (with light fraction components) to the waste stream 26 (with heavy fraction components) may be substantially the same as the ratio of the light fraction components to the heavy fraction components in the input stream 22. As a comparison, typical levels of carbon dioxide in an atmosphere to be processed may be about 0.1-1%. Additionally or alternatively, the output stream 24 may have at least as great mass flow as the waste stream 26. The mass flow ratio of the exit streams (the output stream 24 and the waste stream 26) is related to the cross sectional area ratio of the corresponding ports (the exit port 54 and the waste port 56). Hence, the cross sectional area ratio of the exit port 54 to the waste port 56 (or to the total area of the waste ports 56) may be at least 1:1, at least 2:1, at least 5:1, at least 10:1, at least 100:1, or at least 1000:1. Waste ports 56 may have an effective diameter greater than 0.001 mm (millimeters), greater than 0.01 mm, or greater than 0.1 mm.

Waste port(s) 56 are arranged to preferentially tap the heavy components of the gas stream flowing through the helical duct 12. As shown in FIG. 3, the waste port(s) 56 are arranged along the edges of the loops 64 along an outside edge 66 (radial outside of the loop 64), a leading edge 68 (portion of the loops 64 parallel to the helix axis 46 facing the exit section 62 and/or the exit port 54), or a portion between the outside edge 66 and the leading edge 68.

The helical duct 12 is essentially leak free, emitting only incidental amounts of gas besides the output stream 24 and the waste stream 26. The output stream 24 and the waste stream 26 together are essentially the only gas output from the helical duct 12. The wall of the helical duct 12 and the tube 30 have essentially no cracks, pores, fractures, and/or holes except those associated with the entrance port 52, the exit port 54, and the waste port 56.

The wall of the helical duct 12 and the tube 30 may be substantially gas impermeable under operating conditions (with gas flowing as described herein, e.g., at about standard pressure, about 100 kPa (kilopascals) and temperature, about 20° C.). For example, the wall of the helical duct 12 and the tube 30 may have a helium leak rate of less than 1 mg (milligram) per hour at a pressure differential of 100 kPa across the wall.

Tube 30 may be composed of suitably resilient and gas tight materials such as metal, plastic, etc. For example, the tube 30 may consist essentially of metal such as a 3000-series alloy of aluminum (e.g., 3003 alloy). Alternate materials may be selected based upon characteristics similar to 3000-series aluminum alloys such as similar elongation, tensile strength (e.g., difference between yield strength and ultimate tensile strength), ductility, and/or formability.

Helical ducts 12 generally are configured for a gas flow (a velocity, mass flow rate, temperature, and/or pressure) selected to stratify the gas within the helical duct 12. The velocity of the gas flow may be at least 10 m/s, at least 20 m/s, or at least 50 m/s. The mass flow rate of the gas flow may be at least 0.1 g/s (grams per second), at least 0.5 g/s, at least 2 g/s, or at least 5 g/s. The temperature of the gas flow may be selected to be non-condensing and/or near standard room temperature (e.g., 0° C.-50° C.). The temperature of the gas flow through a helical duct 12 may increase as the gas flows through the helical duct 12, e.g., due to friction of the gas flow. The pressure of the input gas flow may be selected to be near standard atmospheric pressure (e.g., 70-110 kPa) and/or at the pressure of a gas source used to supply gas to the centrifugal air separator 10. The helical duct 12 may be configured to produce a pressure differential between the entrance port 52 and the exit port 54 of less than 100 kPa, less than 60 kPa, or less than 30 kPa when gas is flowing with a mass flow rate of 2.5 g/s from the entrance port 52.

Figure 4:
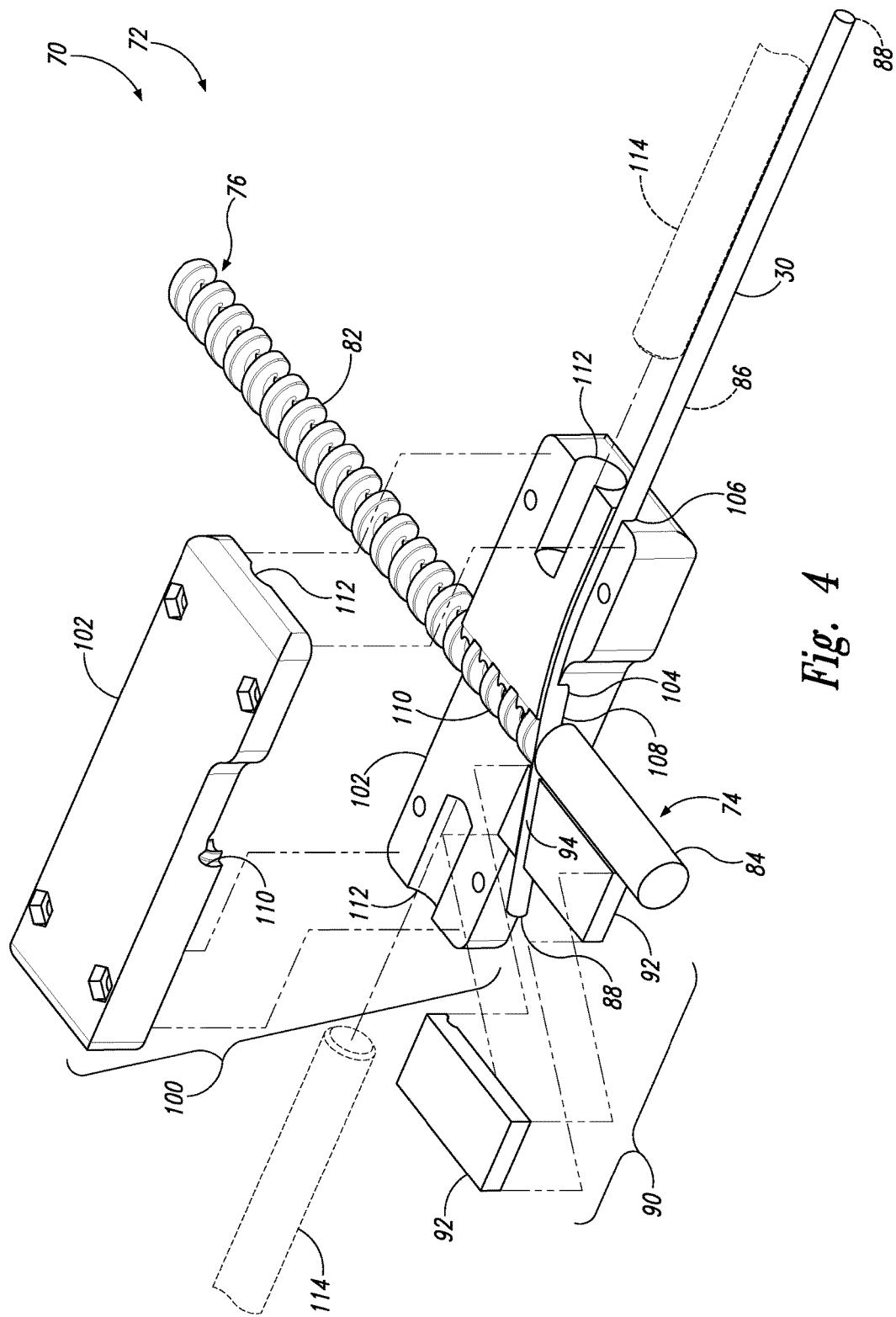
FIG. 4 is a perspective view of an example of a helical coil toolset assembled with a tube to be coiled.

In FIG. 4 is a helical coil assembly 70 that includes a helical coil toolset 72 and a tube 30. The helical coil toolset 72 is configured to form the helical duct 12 by wrapping the tube 30 around a mandrel 74 with a helical groove 76. The mandrel 74 (which may be referred to as a helically grooved mandrel) has a shaft 82 and a shank 84 with the helical groove 76 in the shaft 82. The helical coil toolset 72 includes an entry block 100 configured to guide the tube 30 into the helical groove 76 of the mandrel 74 as the mandrel 74 rotates relative to the entry block 100. The helical coil toolset 72 may include a clamping fixture 90 configured to hold an end of the tube 30 in a fixed position relative to the mandrel 74 as the mandrel 74 rotates relative to the entry block 100.

The helical groove 76 of the mandrel 74 generally has the form of helix with substantially the same dimensions as the helical duct 12 to be formed. The helix axis, helix pitch, and helix angle of the helical groove 76 are the same as the respective helix axis 46, helix pitch 48, and the helix angle 50 of the helical duct 12 to be formed.

Figure 5:
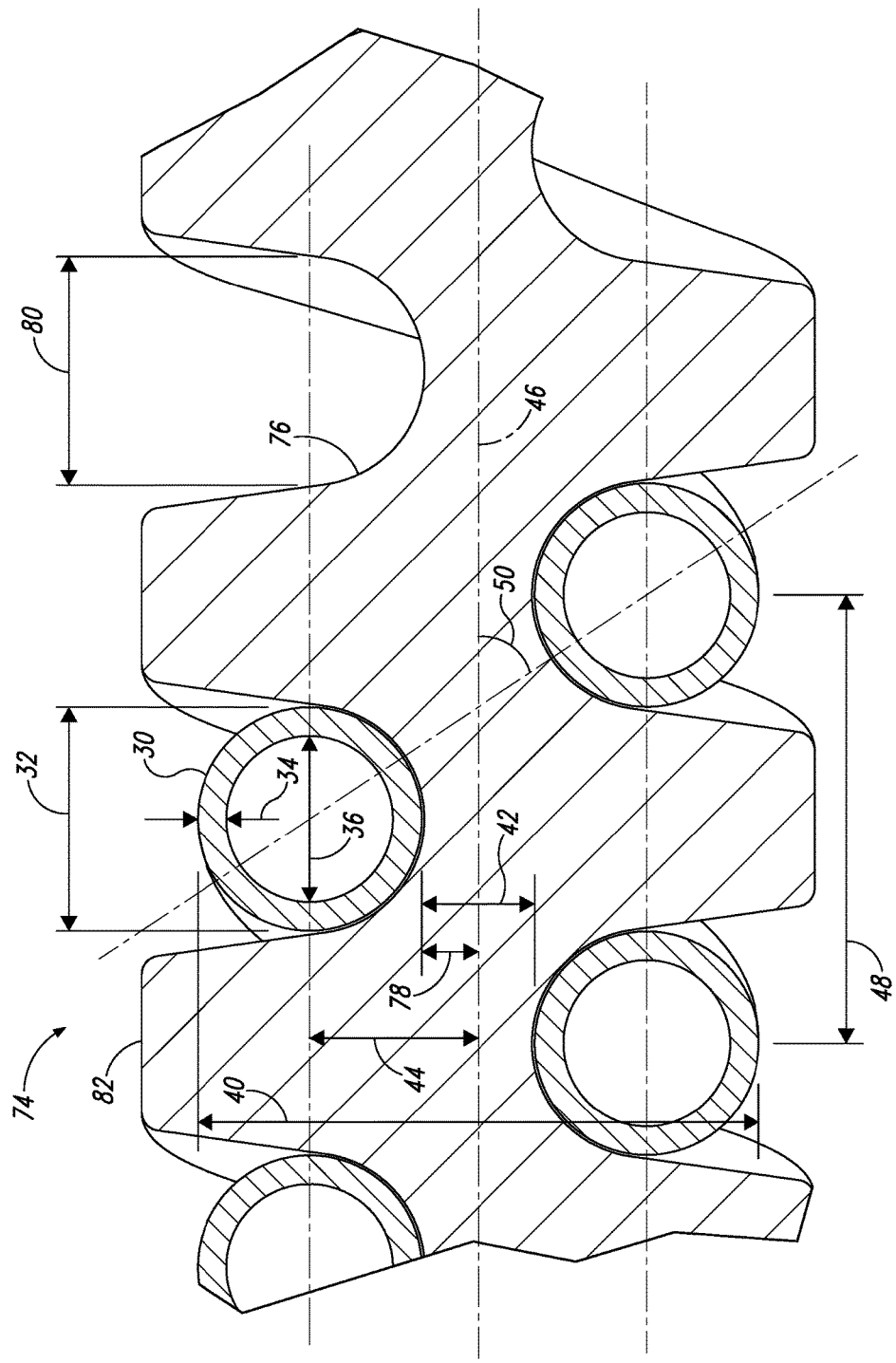
FIG. 5 is a cross-sectional view of an example of a helically grooved mandrel with a tube partially wrapped in the helical groove.

As shown in FIG. 5, the helical groove 76 is sized to accept a portion of an outside circumference of the tube 30 (generally the portion that will form the inside diameter 42 of the helix of the helical duct 12). For example, the groove width 80 of the helical groove 76 is substantially the same as the outside diameter 32 of the tube 30. As shown in FIG. 5, the groove width 80 is measured at the helix radius 44 defined by the mandrel 74. The helical groove 76 has a profile that generally includes a portion which matches the corresponding shape of the outer profile of the tube 30 (generally circular). The profile of the helical groove 76 may include a partial circular portion (e.g., a semicircular portion). The profile of the helical groove 76 may include flat and/or tapered portions to facilitate entry and/or exit of the tube 30 and/or to facilitate lubrication. The groove width 80 is slightly larger than the outside diameter 32 by a clearance margin to account for dimensional tolerances (e.g., manufacturing and/or processing tolerances), any lubricants, and the desired fit. The fit between the tube 30 and the mandrel 74 is a close mechanical fit and may be a sliding fit.

A sliding fit is a close mechanical fit and may be referred to as a running fit, clearance fit, and/or locating fit. A sliding fit provides a clearance between mating parts that may account for part tolerance, dimensional changes with temperature variation, lubrication between parts, slight misalignment of the parts, and/or slight distortion of the part shapes. A sliding fit may permit the tube 30 to slide within the helical groove 76 or other channel (with optional lubricant) without binding. A sliding fit may permit the free assembly and disassembly of the tube 30 within the corresponding channel. FIG. 5 illustrates a sliding fit that is very snug between the helical groove 76 and the tube 30. Examples of sliding fits for a tube 30 with an outside diameter of 6.4 mm (0.25 inches) include a clearance between the outside circumference of the tube and the corresponding channel of at least 20 μm, at least 50 μm, less than 1,000 μm, less than 500 μm, and/or less than 300 μm. Sliding fit clearances for larger or smaller outside diameters may be scaled as understood by one of skill in the art. Generally, the sliding fit clearance is less than or equal to the wall thickness 34 of the tube 30.

The helical groove 76 is configured to form the helical duct 12. Hence, the helical groove 76 may be characterized by the helix outside diameter 40, the helix inside diameter 42, and the helix radius 44 formed by the tube 30 wrapped in the helical groove 76. For example, the inner helix diameter 42 of the helical groove 76 may be less than 3, less than 2, less than 1, greater than 0, greater than 0.5 times the groove width 80 (which corresponds to the outside diameter of the tube 30). The helical groove 76 may include at least as many loops (revolutions) as the loops 64 of the helical duct 12 to be formed. For example, the helical groove may include at least 5, at least 10, less than 100, and/or less than 50 loops.

The shaft 82 and/or the interior of the helical groove 76 may be formed of a material sufficiently rigid to support the tube 30 as it is bent around the helical groove 76. The interior of the helical groove 76 and optionally the shaft 82 may include a material that is configured to avoid binding the tube 30 as it is formed into the helical duct 12 within the helical groove 76. For example, the shaft 82 may be composed of a different material than the tube 30. Suitable materials for the shaft 82 include metal such as steel. Further, to prevent binding, the helical groove 76 may include a lubricant and/or a lubricant may be added to the exterior of the tube 30 and/or the helical groove 76.

Returning to FIG. 4, helical coil assembly 70 includes the tube 30 with a section fixed and/or secured in position relative to the mandrel 74. The tube 30 is restrained at the fixed and/or secured section to move with the mandrel 74. The tube 30 is fixed and/or secured near the helical groove 76 and is generally coupled (directly or indirectly) to the shank 84 of the mandrel 74. For example, the tube 30 may be clamped to the shank 84 and/or may be clamped in a clamping fixture 90. When present, the clamping fixture 90 may be a portion of the helical coil toolset 72. The clamping fixture 90 is configured to restrain the tube 30 from motion relative to the mandrel 74 by holding the tube 30 in a clamp channel 94. In the example of FIG. 4, the clamping fixture 90 is formed of two or more (two shown) clamping fixture members 92 that mate together around the outside circumference of the tube 30. The clamping fixture members 92 may be configured to selectively separate to accept the tube 30 within the clamp channel 94 and to selectively connect around the tube 30 to form the clamping fixture 90.

The tube 30 fits within the clamp channel 94 in the clamping fixture 90. The clamp channel 94 is configured to contact the outside circumference of the tube 30 and to keep the tube 30 from sliding through the clamp channel 94. For example, the clamp channel 94 may be sized and shaped like the tube 30 and may include a resilient surface configured to apply pressure to the outside circumference of the tube 30 when the clamping fixture 90 is assembled around the tube 30. The clamping fixture 90 is coupled to the shank 84 of the mandrel 74. Additionally or alternatively, the tube 30 may be fixed and/or secured to the mandrel 74 by a clamp, fastener, adhesive, solder, etc.

Figure 6:
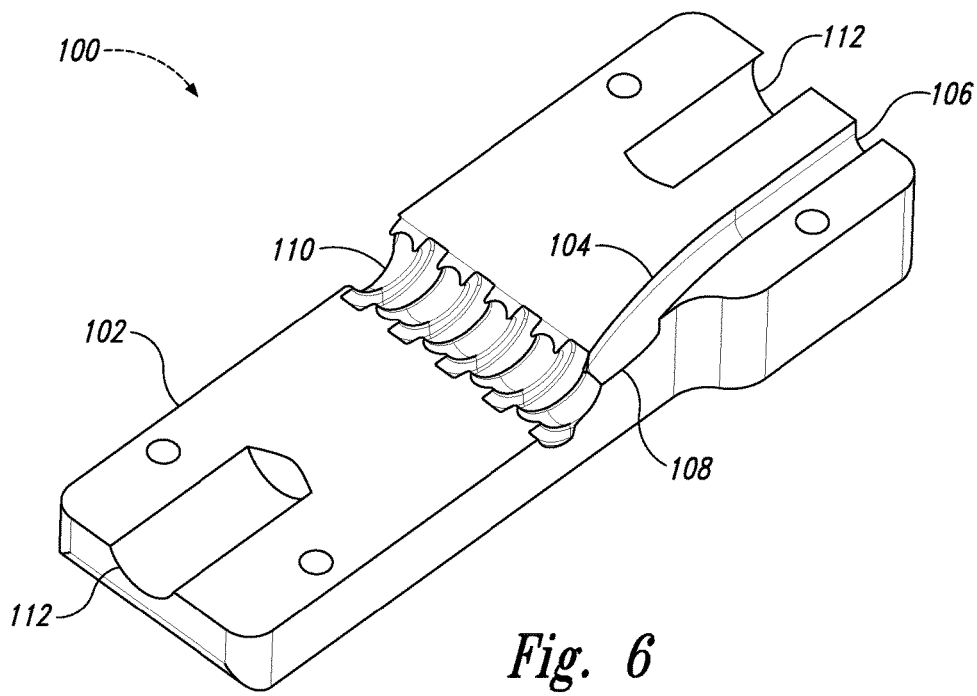
FIG. 6 is a perspective view of an entry block member of FIG. 4.
Figure 7:
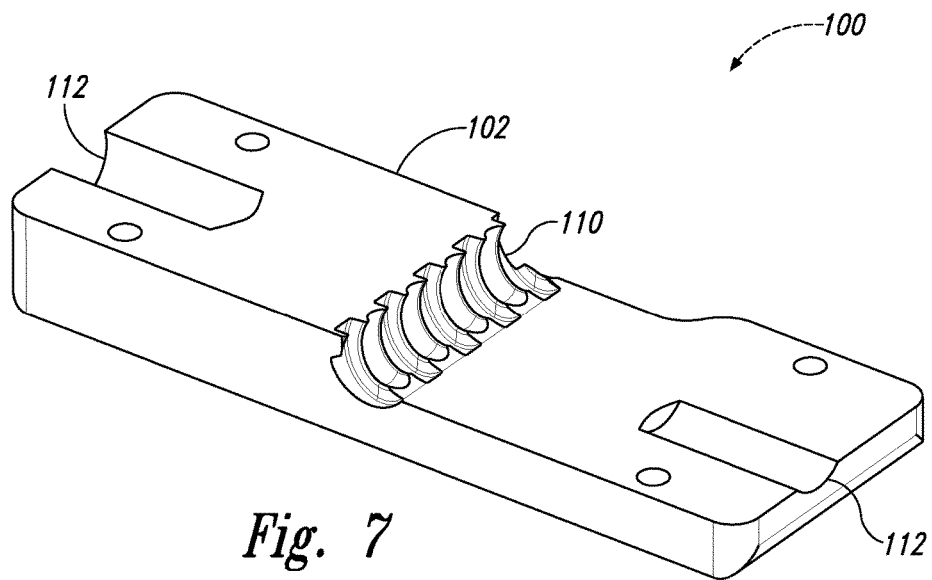
FIG. 7 is a perspective view of an entry block member of FIG. 4 that mates to the entry block member of FIG. 6.

The helical coil toolset 72 includes the entry block 100. The entry block 100 is configured to guide the tube 30 into the helical groove 76 and around the mandrel 74 as the mandrel 74 with the tube 30 is rotated relative to the entry block 100. In the example of FIG. 4, the entry block 100 is formed of two or more (two shown) entry block members 102 that mate together around the tube 30 in a guide channel 104 and around the mandrel 74 in a mandrel channel 110. FIGS. 6 and 7 show details of the mating entry block members 102 of the example of FIG. 4. The entry block members 102 may be configured to selectively separate to accept the tube 30 in the guide channel 104 and/or to accept the mandrel 74 in the mandrel channel 110. The entry block members 102 may be configured to selectively connect around the tube 30 in the guide channel 104 and/or around the mandrel 74 in the mandrel channel 110 to form the entry block 100.

As shown in FIG. 4, the guide channel 104 of the entry block 100 is configured to accept the outside circumference of the tube 30 and permit the tube 30 to slide through the guide channel 104. The guide channel 104 may be sized and shaped to fit the tube 30 and may have a profile that matches the tube 30. The profile of the guide channel 104 may include a section that is shaped the same as the corresponding section of the tube 30. For example, the guide channel 104 may have a substantially circular profile or a semicircular profile. The guide channel 104 may include at least a section that is sized for a sliding fit of the tube 30.

The guide channel 104 has a guide channel entrance 106 configured to accept a length of tube 30 (e.g., from a spool of tube 30) and a guide channel exit 108 that connects to the mandrel channel 110 at a point aligned with the helical groove 76 of the mandrel 74 (when present in the mandrel channel 110). The guide channel exit 108 is configured to discharge the tube 30 at the helix angle 50 of the helical groove 76. The guide channel exit 108 is oriented at the helix angle 50 of the helical groove 76 when the mandrel 74 is in the mandrel channel 110. As shown in FIG. 4, the guide channel entrance 106 may be configured to accept the tube 30 at an angle substantially perpendicular to the helix axis 46 of the helical groove 76. The guide channel entrance 106 may be oriented substantially perpendicular to the helix axis 46. Thus, the entry block 100 may be configured to feed the tube 30 from an angle substantially perpendicular to the helix axis 46 and to redirect the tube 30 into the helix angle 50 as the tube 30 is discharged from the guide channel 104 into the helical groove 76. Feeding the tube 30 from a substantially perpendicular angle may be useful for a compact apparatus to produce a helical duct 12 with the helical coil toolset 72 and/or for an apparatus that may be reconfigured for different helical ducts 12 with different helix angles 50.

The mandrel channel 110 of the entry block 100 is configured to receive the helical groove 76 of the mandrel 74 and may be configured to receive at least a portion of the tube 30 wrapped within the helical groove 76. Hence, the mandrel channel 110 may have features sized and shaped to mate the helical groove 76 and may be sized for a sliding fit of the helical groove 76 of the mandrel 74.

The entry block 100 may include one or more handles 114 and/or one or more handle seats 112 to receive one or more handles 114. When assembled with handles 114, the handles 114 may be useful to restrain the entry block 100 as the mandrel 74 rotates within the entry block 100 to wrap the tube 30 within the helical groove 76 and/or to guide the entry block 100 as the entry block 100 rotates around the mandrel 74 within the entry block 100.

Figure 8:
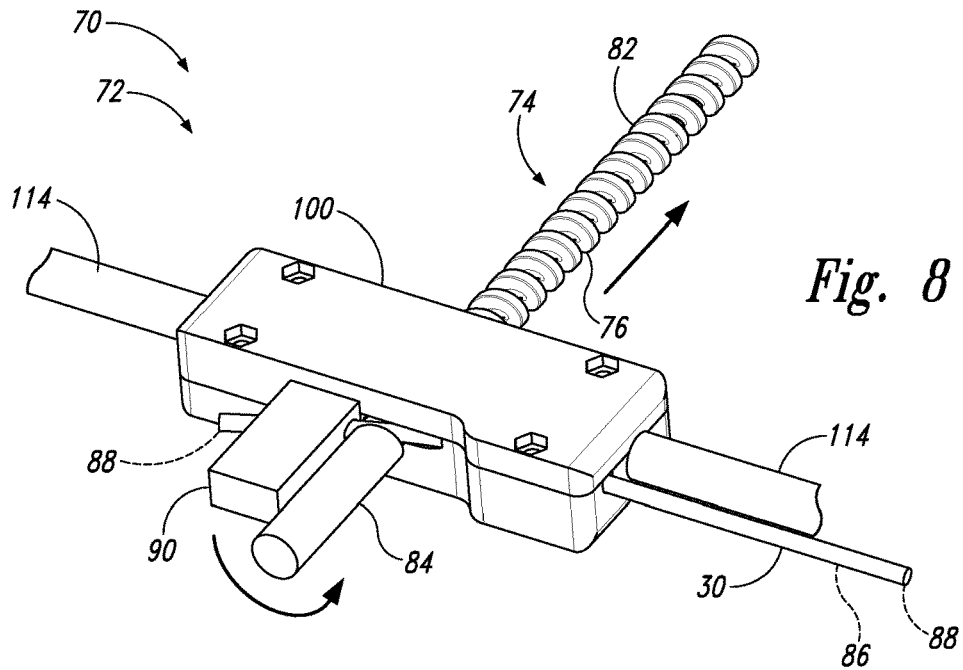
FIG. 8 is a perspective view of the helical coil toolset of FIG. 4 illustrating motion of the components to form the helical duct from the tube.

FIG. 8 illustrates an assembled helical coil assembly 70 of the helical coil toolset 72 and the tube 30. As the mandrel 74 is rotated with respect to the entry block 100 (as indicated by the curved broad arrow in FIG. 8), the tube 30 is wrapped around the mandrel 74 within the helical groove 76. As indicated by the straight broad arrow in FIG. 8, the rotation of the mandrel 74 with respect to the entry block 100 causes the entry block with the tube 30 to travel away from the clamped end of the tube 30 (at the clamping fixture 90). In FIG. 8, the rotational motion is illustrated as counterclockwise and helical groove 76 has a right-handed twist. The helical groove 76 could have a left-handed twist, in which case the mandrel 74 would be rotated clockwise with respect to the entry block 100 to thread the tube 30 into the helical groove 76. The relative rotation of the mandrel 74 (to wrap the tube 30 into the helical groove 76) causes the entry block 100 with the tube 30 to travel away from the clamped end of the tube 30 regardless of the twist of the helical groove 76. The relative motion of the mandrel 74 and the entry block 100 bends the tube 30 within the helical groove 76 to form the helical duct 12. The result of rotating the mandrel 74 with respect to the entry block 100 to form the helical duct 12 is shown in FIG. 9.

To support the tube 30 as it is bent with the helical coil toolset, the tube 30 may be filled with support material such as fine particles 86. In the helical duct 12, the wall of the tube 30 near the helix inside diameter 42 is bent with a shorter radius of curvature than the wall near the helix outside diameter 40. Hence, the act of bending the tube 30 may produce differential stresses which may flatten, wrinkle, buckle, distort, and/or crack the tube 30. The support material is configured to retain the interior profile of the tube 30 as it is bent, avoiding flattening, wrinkling, and/or distorting of the tube 30 during the bending process. The support material may be configured to distort as the tube 30 is bent (e.g., to accommodate the greater compressive stress on the inside of the helical curvature and/or to accommodate the greater elongation stress on the outside of the helical curvature). The support material may be configured to tightly pack within the tube 30 prior to bending and may be configured to be flushed out of the tube 30 after bending. As a particular type of support material, fine particles 86 may be useful because they may pack tightly within the tube 30 and yet may redistribute while the tube 30 is bent. Though fine particles 86 were found suitable for bending aluminum alloy tubes (such as aluminum alloy 3003) into helical duct 12, CERROBEND brand metal alloy (marketed to support tubing during bending) was found unsuitable as a support material because the integrity of the tube 30 of aluminum alloy was disrupted during bending. To facilitate filling and/or retaining the support material, the tube 30 may be sealed at one or both ends, e.g., with a seal 88. Seal 88 may be a plug, a cap, etc. Additionally or alternatively, tube 30 may be sealed by crimping, bending, etc.

Where support material includes fine particles 86, the fine particles 86 may be particles such as used for water blasting and/or sand blasting. Fine particles 86 may be inert, non-binding (e.g., easily released from the tube 30), and/or non-damaging to the interior of the tube 30. Fine particles 86 may include, and/or consist essentially of, silicate, garnet, aluminum oxide, and glass. Fine particles 86 may have an ANSI (American National Standards Institute) grit size of at least 80, at least 100, at least 120, at most 320, and/or at most 240. Fine particles 86 may have an average particle size of less than 180 µm, less than 150 µm, less than 100 µm, greater than 30 µm, and/or greater than 50 µm.

Figure 9:
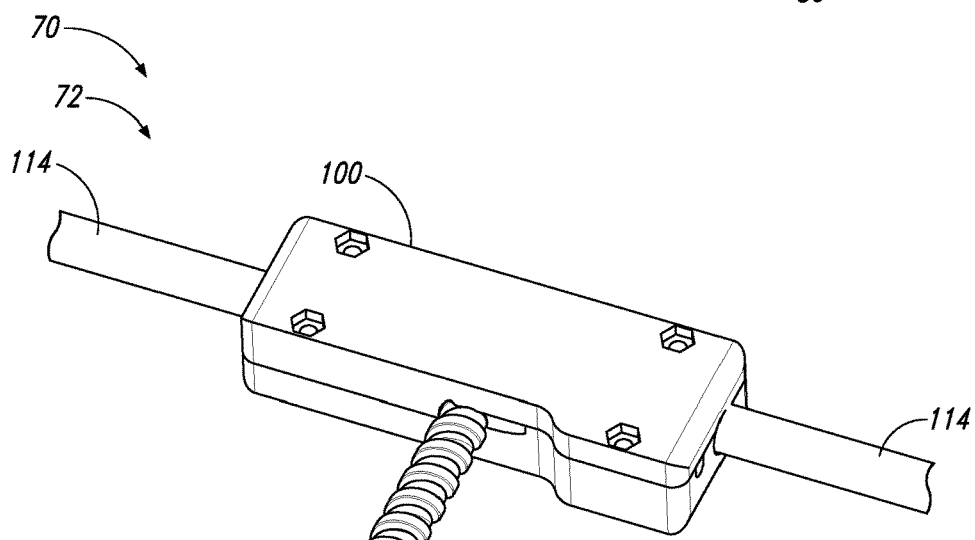
FIG. 9 is a perspective view of the helical coil toolset of FIG. 6 after the tube is formed into the helical duct.

In FIG. 9, the helical duct 12 is formed around the mandrel 74. The helical duct 12 may be used in this configuration (in the helical coil assembly 70), at least the clamping fixture 90 and the entry block 100 may be removed from the assembly, and/or the helical coil 12 may be removed from the mandrel 74. After forming the helical coil 12 around the mandrel 74, the tube 30 may be in close contact with the mandrel 74 across a large surface area. In some configurations, the helical coil 12 may be simply removed from the mandrel 74 by unthreading the helical coil 12. For example, lubricant may facilitate removal, the relative sizes of the helical coil 12 and the mandrel 74 may be adjusted by thermal expansion/contraction to produce a sufficiently loose fit. To reduce the chance of damaging the helical coil 12 as it is removed from the mandrel 74 and/or to remove the helical coil 12 that is closely fit around the mandrel 74, a removal fixture 120 may be used.

Figure 10:
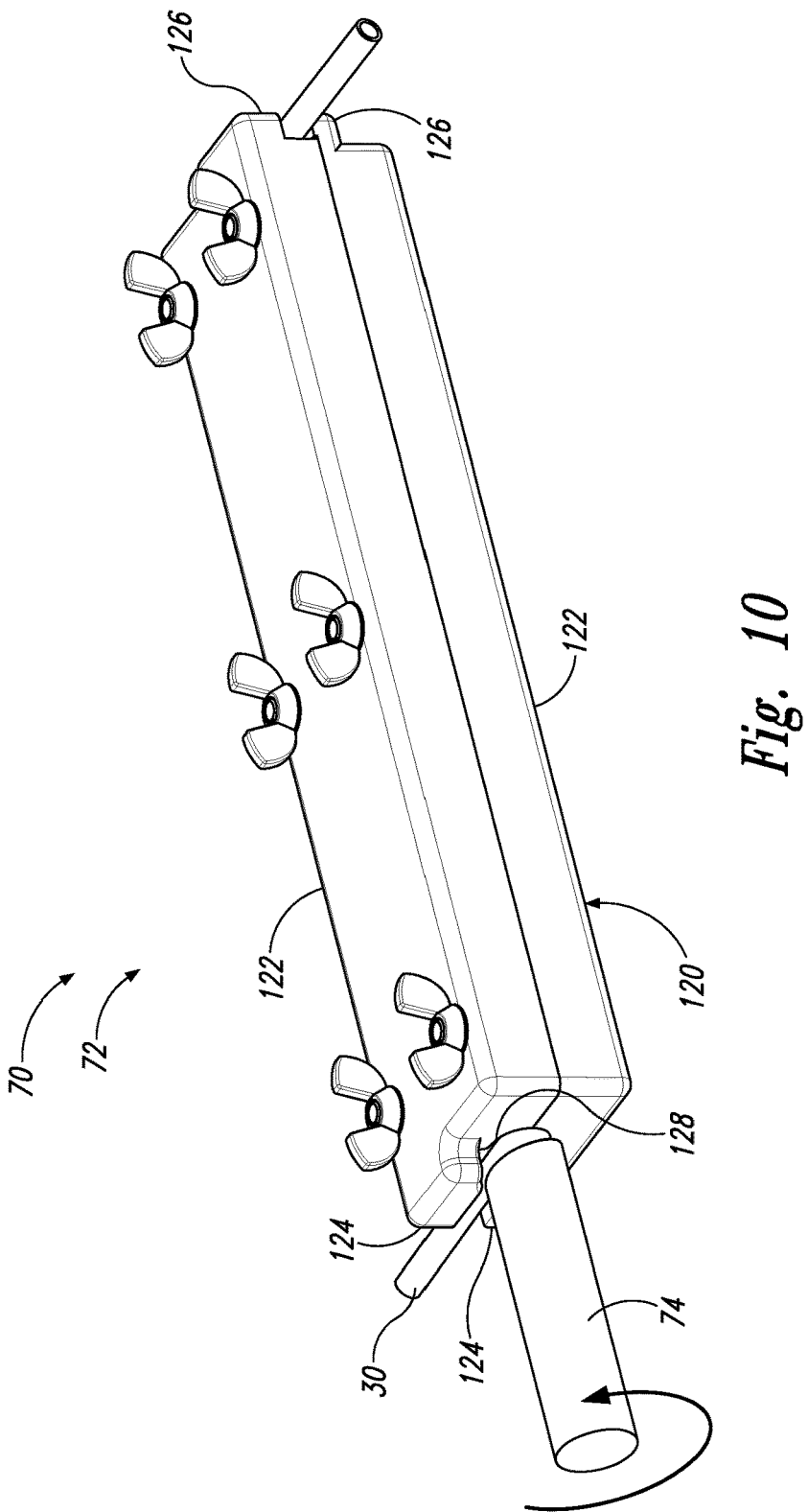
FIG. 10 is a perspective view of a removal fixture assembled to the mandrel and helical duct of FIG. 9.
Figure 11:
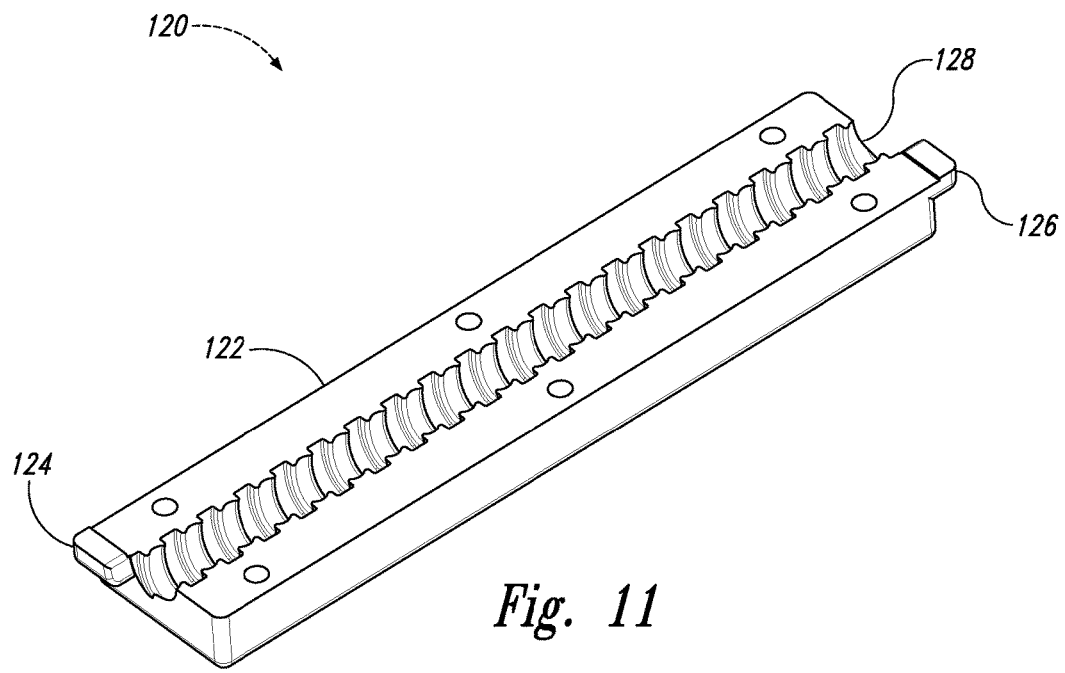
FIG. 11 is a perspective view of a removal fixture member of FIG. 10.
Figure 12:
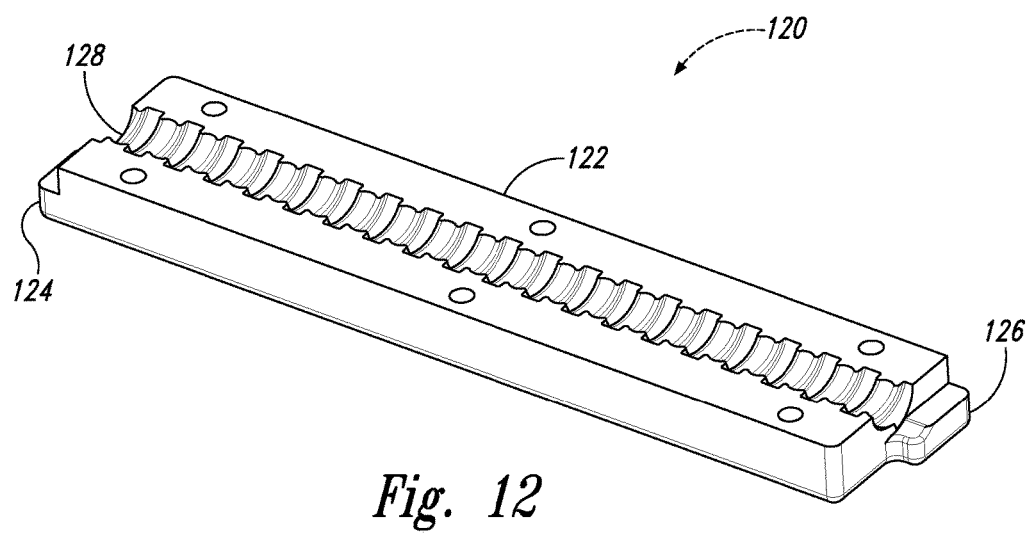
FIG. 12 is a perspective view of a removal fixture member of FIG. 10 that mates to the removal fixture of FIG. 11.

FIG. 10 illustrates an example of the removal fixture 120. The removal fixture 120 is assembled around the helical duct 12 and the mandrel 74. The clamping fixture 90 and the entry block 100 shown in FIG. 9 are removed. The removal fixture 120 is configured to maintain the helical shape of the helical duct 12 as the mandrel 74 is unthreaded from the tube 30. The removal fixture 120 includes a mandrel channel 128 configured to receive the mandrel 74 with the tube 30 wrapped in the form of the helical duct 12. The removal fixture 120 may be formed of two or more removal fixture members 122 that mate together around the tube 30 while the tube 30 is fit within the helical groove 76 of the mandrel 74. FIGS. 11 and 12 show details of the mating removal fixture members 122 of the example of FIG. 10. The removal fixture members 122 may be configured (a) to selectively separate to accept the mandrel 74 with the tube 30 wrapped in the form of the helical duct 12, (b) to selectively connect around the mandrel 74 with the tube 30 wrapped in the form of the helical duct 12, and/or (c) to selectively separate to permit removal of the helical duct 12 once unthreaded from the mandrel 74.

The mandrel channel 128 of the removal fixture 120 is sized and shaped to support the tube 30 as the mandrel 74 is unthreaded. The profile of the mandrel channel 128 may include a portion that mates to a portion of the outside of the tube 30, e.g., a semicircular profile sized to accept the outside circumference of the tube 30. The mandrel channel 128 may fit the outside perimeter of the helical duct 12 with a close fit and/or a sliding fit.

To facilitate the removal of the mandrel 74 from the helical duct 12, tube 30 at one or both ends of the removal fixture 120 may be fixed and/or secured to the removal fixture 120 (e.g., clamped, restrained, and/or fastened). For example, the removal fixture 120 may include an entrance brace 124 and/or an exit brace 126 at the ends of the mandrel channel 128 that are configured to restrain the tube 30 in a fixed location relative to the removal fixture 120. The entrance brace(s) 124 may be configured to support the tube 30 as the tube 30 enters the helical groove 76 as the mandrel 74 is unthreaded from the helical duct 12. The exit brace(s) 126 may be configured to support the tube 30 from the side of the removal fixture 120 where the tube 30 exits the helical groove 76 as the mandrel 74 is unthreaded from the helical duct 12.

Figure 13:
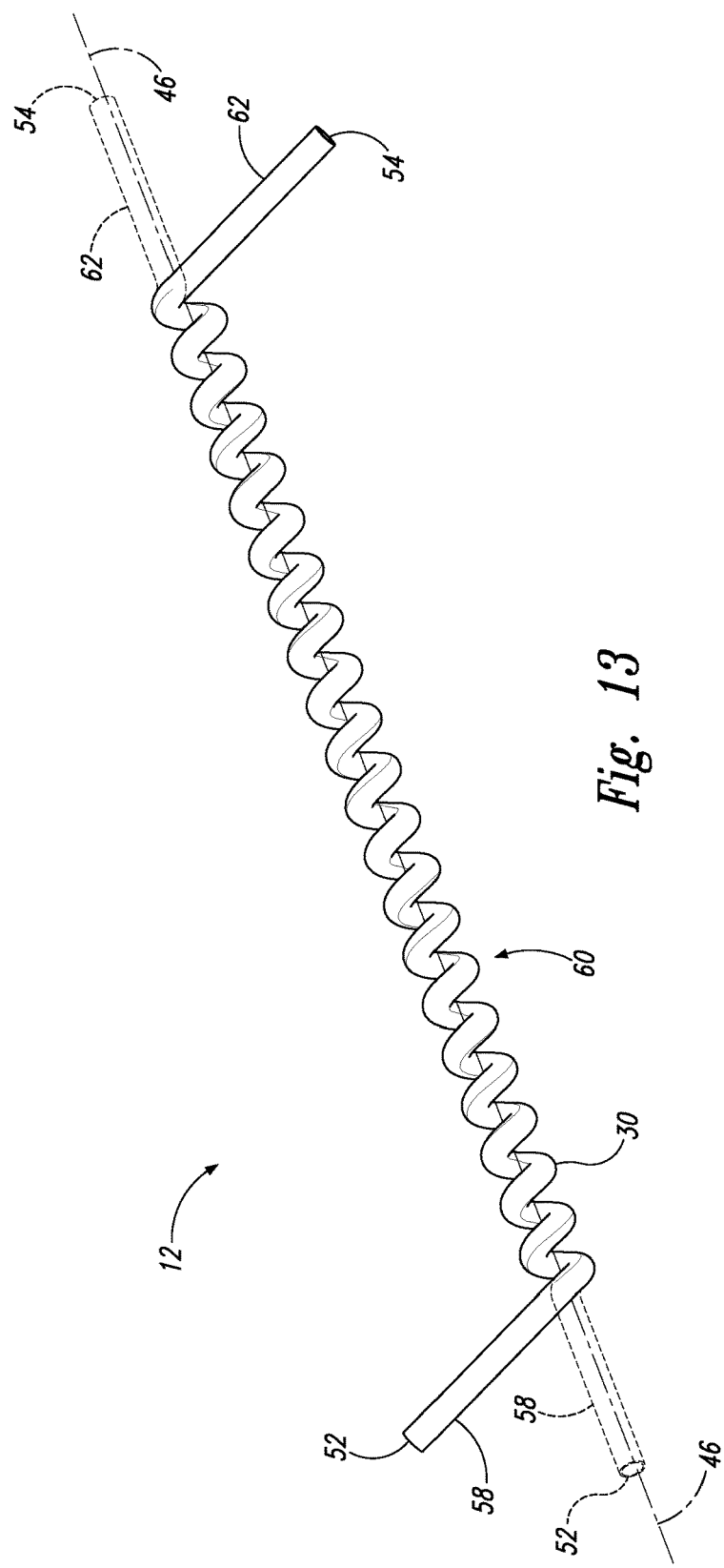
FIG. 13 is a perspective view of the helical duct after removal from the helically grooved mandrel.

FIG. 13 illustrates the helical duct 12 after removal from the mandrel 74. The coil section 60 has the form imposed by wrapping the tube 30 around the helical groove 76. Leading to the coil section 60 is the entrance section 58 that terminates with the entrance port 52. As shown in solid lines, the entrance section 58 may project at substantially the helix angle 50 away from the helix axis 46. As shown in dotted lines, the entrance section 58 may be aligned substantially parallel to the helix axis 46. Following from the coil section 60 is the exit section 62 that terminates with the exit port 54. As shown in solid lines, the exit section 62 may project at substantially the helix angle 50 away from the helix axis 46. As shown in dotted lines, the exit section 62 may be aligned substantially parallel to the helix axis 46. Aligning the entrance section 58 and/or the exit section 62 with the helix angle 50 may simplify the manufacturing procedure (e.g., less bending) and/or reduce the possibility of wrinkling, buckling, distorting, and/or cracking of the tube 30 at the transition to/from the coil section 60. Aligning the entrance section 58 and/or the exit section 62 with the helix axis 46 may facilitate ganging several helical ducts 12 together and/or fabricating a more compact centrifugal air separator 10.

Figure 14:
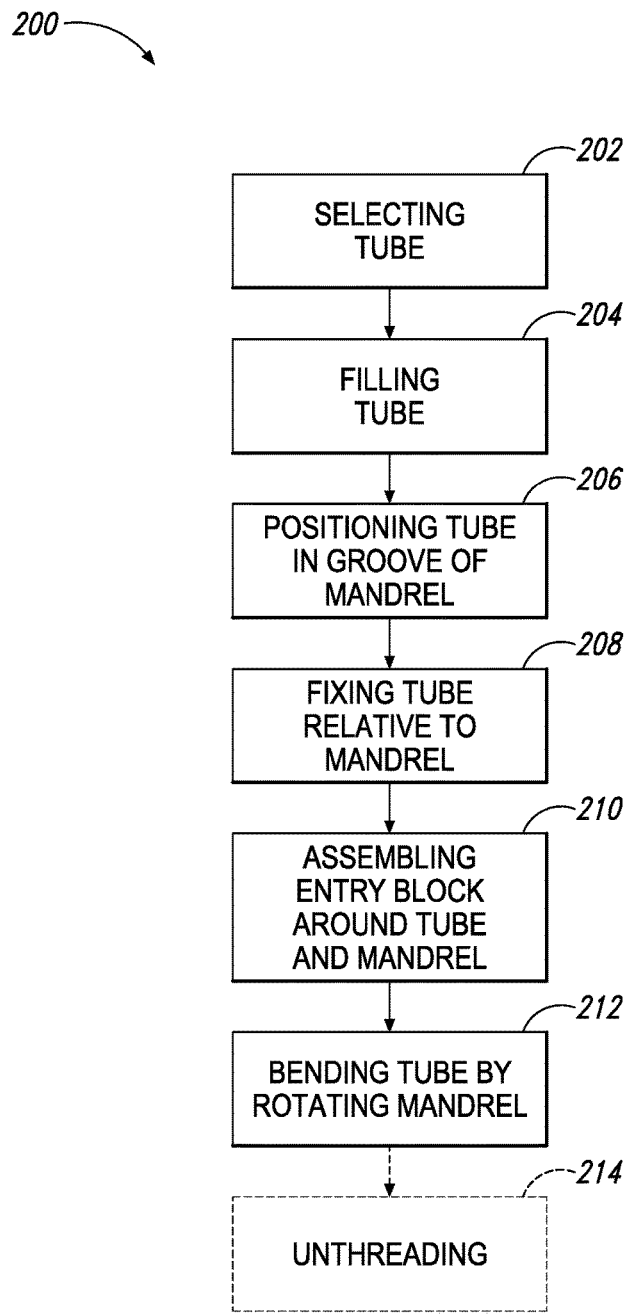
FIG. 14 is a schematic representation of methods according to the present disclosure.

FIG. 14 is a schematic representation of methods 200 of forming tubing (such as tube 30) into a helical duct (such as helical duct 12). Methods 200 include selecting 202 a tube, filling 204 the tube, positioning 206 the tube in the helical groove of a helically grooved mandrel, fixing 208 a section of the tube relative to the mandrel, assembling 210 an entry block such as entry block 100 around the mandrel and tube, and bending 212 the tube around the mandrel by rotation of the mandrel relative to the entry block with the tube.

Selecting 202 may include selecting tube 30. Generally, the tube selected is a thin wall tube which with conventional methods would be unsuitable for bending at the radius of curvatures described herein. For example, the wall thickness of the tube may be less than 15% of the outside diameter of the tube. Before bending 212, the tube may have a vacuum tight wall with helium leakage rates as described herein. After bending 212, the bent tube may have substantially the same wall integrity.

Filling 204 is performed to support the tube as it is bent and to provide a smooth bend with little to no wrinkling, buckling, flattening, distorting, and/or cracking of the tube. Filling 204 may include filling the tube with support material such as fine particles 86 to form a filled tube. Filling 204 may include sealing an end of the tube and inserting the support material (e.g., pouring the fine particles 86) into the tube. Filling 204 may include forming seals at one or both ends of the tube with the support material between the seals. The seal or seals may prevent the support material from excessive motion and/or migration during the insertion of the support material and/or during the bending 212.

Positioning 206 includes positioning a portion of the tube in a portion of the helical groove. Positioning 206 starts the tube in the helical groove so that as the mandrel is rotated relative to the entry block the tube is guided into the helical groove. The helically grooved mandrel may be the mandrel 74 with the helical groove 76.

Fixing 208 includes fixing a first section of the tube relative to the mandrel. The first section of the tube is proximate to the helical groove and the portion of the tube that is placed (or to be placed) in the helical groove by the positioning 206. Fixing 208 may include fixing and/or securing the first section of the tube to the mandrel such that the first section of tube moves with the mandrel as the mandrel rotates relative to the entry block. Fixing 208 may include clamping the first section of tube, for example with the clamping fixture 90 (e.g., by assembling the clamping fixture members 92 around the first section of tube).

Assembling 210 includes assembling the entry block around a second section of the tube that is different from the first section fixed (or to be fixed) to the mandrel by the fixing 208. The first section of tube and the second section of tube are on opposite sides of the portion of the tube that is placed (or to be placed) in the helical groove by the positioning 206. The second section of tube is held in a close fit (e.g., a sliding fit) within the entry block (i.e., within the guide channel 104).

Assembling 210 includes assembling the entry block around the mandrel with the portion of the tube within the helical groove. The mandrel is held in the entry block (e.g., within the mandrel channel 110 of the entry block 100) in a close fit (e.g., a sliding fit). Assembling 210 may include assembling entry block members (e.g., entry block members 102) around the second section of tube and the mandrel with the portion of tube within the helical groove. Assembling 210 may include, but does not require, completely enclosing the circumference of the tube within the entry block and/or completely enclosing the circumference of the mandrel within the entry block.

Bending 212 includes bending the filled tube around the mandrel within the helical groove by rotating the mandrel relative to the entry block with the filled tube. Either or both of the mandrel and the entry block may be rotated. Bending 212 includes linearly translating the entry block relative to the mandrel according to the helix pitch such that the filled tube is wrapped around the mandrel in the helical groove. For example, one revolution of the mandrel relative to the entry block results in a translation (along the helix axis 46) of the entry block relative to the mandrel of a length equal to the helix pitch 48.

Bending 212 includes bending the tube into a tightly coiled shape defined by the helical groove as discussed herein. The tightly coiled shape may have a helix outside diameter 40 that is less than 5, less than 4, less than 3, greater than 2, and/or greater than 2.5 times the outside diameter of the tube. The corresponding helix inside diameter 42 is less than 3, less than 2, less than 1, greater than 0, and/or greater than 0.5 times the outside diameter of the tube. The corresponding helix radius 44 is less than 2, less than 1.5, less than 1, greater than 0.5, and/or greater than 0.75 times the outside diameter of the tube.

Bending 212 may include forming at least 5, at least 10, less than 100, and/or less than 50 loops in the tube. Bending 212 may include rotating the mandrel relative to the entry block with a substantially constant velocity for all or a portion of the loops formed. The variation in the substantially constant velocity may be less than 10% or less than 1% during a revolution to form a loop.

Bending 212 may include bending the tube smoothly to preserve the interior profile and finish of the tube. Bending 212 may include bending without wrinkling, buckling, distorting, and/or cracking the tube. Bending 212 may include maintaining an interior finish of the tube at an average roughness of less than 50 µm, less than 20 µm, less than 10 µm, less than 5 µm, or less than 2 µm. Bending 212 may include maintaining the wall integrity (e.g., vacuum tightness) of the tube, e.g., keeping the helium leak rate at a level less than described herein.

Methods 200 may include removing the toolset components (e.g., the mandrel, the entry block, and/or the clamping fixture) from the formed helical duct after the bending 212. Methods 200 may include unthreading 214 the formed helical duct from the mandrel after the bending 212. Unthreading 214 may include supporting the helical duct as the helical duct is unthreaded from the mandrel and to preserve the helical shape of the helical duct during the unthreading. Unthreading 214 may include applying a removal fixture (such as removal fixture 120) to the helical duct formed around the mandrel. Methods 200 may include releasing the first section of the tube from the mandrel (e.g., unclamping the first section) after the bending 212 and/or before the unthreading 214.

Methods 200 may include clearing out the support material from the tube after the bending 212. Clearing out may be performed before and/or after the unthreading 214. Clearing out may include unsealing the ends of the tube and draining and/or flushing the support material from the helical duct. Clearing out may include cleaning the interior of the helical duct to remove debris and/or residual support material from the helical duct. Clearing out may include polishing the interior of the helical duct to smooth the interior, optionally to an average roughness of less than 50 µm, less than 20 µm, less than 10 µm, less than 5 µm, or less than 2 µm.

Methods 200 may include forming an entrance section and/or an exit section of the helical duct by bending one or both end regions of the helical duct. The entrance section and/or the exit section may be at substantially the helix angle of the helix of the helical duct. The entrance section and/or the exit section may be substantially parallel to the helix axis of the helix of the helical duct.

Methods 200 may include forming one or more waste ports (such as waste port 56) at the end of a coil section (the end of the helix) of the helical duct. Forming the waste port(s) may include forming an aperture (e.g., drilling) in the wall of the tube of the helical duct. The waste port(s) may be positioned and/or sized as described herein.

Examples of inventive subject matter according to the present disclosure are described in the following enumerated paragraphs.

A1. A helical coil toolset comprising:

a helically grooved mandrel with a helical groove sized to accept a portion of an outside circumference of a tube, optionally in a sliding fit, wherein the helical groove has a helix inside diameter that is less than twice a width of the helical groove; and an entry block with a guide channel and a mandrel channel, wherein the guide channel is sized to fit the outside circumference of the tube and to permit the tube to slide through, the guide channel has an exit that connects with the mandrel channel, the mandrel channel is configured to receive the helical groove of the helically grooved mandrel, and the guide channel is configured to direct the tube into the helical groove of the helically grooved mandrel.

A2. The helical coil toolset of paragraph A1, wherein the helical groove includes a semicircular profile sized to accept the outside circumference of the tube, optionally in a sliding fit.

A3. The helical coil toolset of any of paragraphs A1-A2, wherein the helical groove has a helix pitch of less than 4, less than 3, and/or greater than 1 times the width of the helical groove.

A4. The helical coil toolset of any of paragraphs A1-A3, wherein the helical groove has a helix angle of less than 80°, less than 70°, greater than 30°, greater than 45°, and/or greater than 60°.

A5. The helical coil toolset of any of paragraphs A1-A4, wherein the helically grooved mandrel includes a shaft that defines the helical groove, wherein the shaft includes, optionally consists essentially of, at least one of metal and steel.

A6. The helical coil toolset of any of paragraphs A1-A5, wherein the helical groove includes at least 5, at least 10, less than 100, and/or less than 50 loops.

A7. The helical coil toolset of any of paragraphs A1-A6, wherein the guide channel of the entry block has an at least semicircular profile, optionally a substantially circular profile.

A8. The helical coil toolset of any of paragraphs A1-A7, wherein the exit of the guide channel is oriented at a/the helix angle of the helical groove when the helically grooved mandrel is in the mandrel channel.

A9. The helical coil toolset of any of paragraphs A1-A8, wherein the guide channel has an entrance oriented substantially perpendicular to a helix axis of the helical groove when the helically grooved mandrel is in the mandrel channel.

A10. The helical coil toolset of any of paragraphs A1-A9, wherein the mandrel channel of the entry block is configured to fit around the helically grooved mandrel with the tube wrapped around the helically grooved mandrel within the helical groove.

A11. The helical coil toolset of any of paragraphs A1-A10, wherein the entry block includes at least two entry block members that are configured to selectively separate to accept the helically grooved mandrel in the mandrel channel and to selectively connect around the helically grooved mandrel to form the entry block.

A12. The helical coil toolset of any of paragraphs A1-A11, wherein the entry block includes one or more handles.

A13. The helical coil toolset of any of paragraphs A1-A12, wherein the entry block includes one or more handle seats configured to receive a handle.

A14. The helical coil toolset of any of paragraphs A1-A13, further comprising a clamping fixture configured to restrain the tube with respect to the helically grooved mandrel.

A14.1. The helical coil toolset of paragraph A14, wherein the clamping fixture is configured to be assembled around the tube.

A14.2. The helical coil toolset of any of paragraphs A14-A14.1, wherein the clamping fixture includes a clamp channel configured to contact the outside circumference of the tube, optionally wherein the clamp channel has a circular profile sized to contact around the outside circumference of the tube.

A15. The helical coil toolset of any of paragraphs A1-A14.2, further comprising a removal fixture configured to maintain a tightly-coiled helical shape of a tube wrapped around the helically grooved mandrel in the helical groove as the helically grooved mandrel is unthreaded from the tube.

A15.1. The helical coil toolset of paragraph A15, wherein the removal fixture includes a mandrel channel sized to fit the helically grooved mandrel and the tube wrapped around the helically grooved mandrel in the helical groove, and optionally wherein the mandrel channel of the removal fixture includes a semicircular profile sized to accept the outside circumference of the tube, optionally in a sliding fit.

A15.2. The helical coil toolset of any of paragraphs A15-A15.1, wherein the removal fixture includes an entrance brace and/or an exit brace, wherein the entrance brace is configured to restrain the tube relative to the removal fixture as the tube enters the helical channel, and wherein the exit brace is configured to restrain the tube relative to the removal fixture as the tube exits the helical channel.

A16. A helical coil assembly comprising:
the helical coil toolset of any of paragraphs A1-A15.2; and
a thin wall tube formed around the helically grooved mandrel and in the helical groove.

A16.1. The helical coil assembly of paragraph A16, wherein the thin wall tube has an outside diameter of less than 20 mm, less than 15 mm, less than 10 mm, greater than 1 mm, and/or greater than 2 mm.

A16.2. The helical coil assembly of any of paragraphs A16-A16.1, wherein the thin wall tube has a wall thickness to outside diameter ratio of less than 15%, less than 10%, greater than 5%, and/or greater than 8%.

A16.3. The helical coil assembly of any of paragraphs A16-A16.2, wherein the thin wall tube has a wall thickness of less than 2 mm, less than 1 mm, greater than 0.1 mm, and/or greater than 0.2 mm.

A16.4. The helical coil assembly of any of paragraphs A16-A16.3, wherein the thin wall tube has a circular interior profile and/or a circular exterior profile.

A16.5. The helical coil assembly of any of paragraphs A16-A16.4, wherein the thin wall tube consists essentially of a metal, optionally a 3000-series alloy of aluminum.

A16.6. The helical coil assembly of any of paragraphs A16-A16.5, wherein the helically grooved mandrel includes a/the shaft that defines the helical groove, wherein the shaft is composed of a material different than the thin wall tube.

A16.7. The helical coil assembly of any of paragraphs A16-A16.6, wherein the thin wall tube has an interior finish with an average roughness of less than 50 µm, less than 20 µm, less than 10 µm, less than 5 µm, or less than 2 µm.

A16.8. The helical coil assembly of any of paragraphs A16-A16.7, wherein the thin wall tube is filled with fine particles.

A16.8.1. The helical coil assembly of paragraph A16.8, wherein the fine particles have an ANSI grit size of at least 80, at least 100, at least 120, at most 320, and/or at most 240.

A16.8.2. The helical coil assembly of any of paragraphs A16.8-A16.8.1, wherein the fine particles have an average particle size of less than 180 µm, less than 150 µm, less than 100 µm, greater than 30 µm, and/or greater than 50 µm.

A16.8.3. The helical coil assembly of any of paragraphs A16.8-A16.8.2, wherein the fine particles include, optionally consist essentially of, at least one of silicate, garnet, aluminum oxide, and glass.

B1. A method for forming thin wall tubing into a tightly-coiled helical duct, the method comprising:

selecting a thin wall tube with an outside diameter and a wall thickness that is less than 15% of the outside diameter;

filling the thin wall tube with fine particles to form a filled tube;

positioning a portion of the thin wall tube in a portion of a helical groove of a helically grooved mandrel;

fixing a first section of the thin wall tube relative to the helically grooved mandrel, wherein the first section is proximate to the portion of the thin wall tube in the portion of the helical groove;

assembling an entry block around a second section of the thin wall tube and around the helically grooved mandrel, wherein the portion of the thin wall tube in the portion of the helical groove is between the first section and the second section of the thin wall tube; and bending the filled tube around the helically grooved mandrel by rotating the helically grooved mandrel relative to the entry block assembled around the thin wall tube and helically grooved mandrel, wherein the bending includes forming a tightly-coiled helical duct within the helical groove from the thin wall tube with an outside diameter of the tightly-coiled helical duct that is less than four times the outside diameter of the thin wall tube.

B2. The method of paragraph B1, wherein the thin wall tube has an outside diameter of less than 20 mm, less than 15 mm, less than 10 mm, greater than 1 mm, and/or greater than 2 mm.

B3. The method of any of paragraphs B1-B2, wherein the thin wall tube has a wall thickness to outside diameter ratio of less than 10%, greater than 5%, and/or greater than 8%.

B4. The method of any of paragraphs B1-B3, wherein the thin wall tube has a wall thickness of less than 2 mm, less than 1 mm, greater than 0.1 mm, and/or greater than 0.2 mm.

B5. The method of any of paragraphs B1-B4, wherein the thin wall tube has a circular interior profile and/or a circular exterior profile.

B6. The method of any of paragraphs B1-B5, wherein the thin wall tube consists essentially of a metal, optionally a 3000-series alloy of aluminum.

B7. The method of any of paragraphs B1-B6, wherein the selecting includes selecting the thin wall tube composed of a material different than the helically grooved mandrel.

B8. The method of any of paragraphs B1-B7, wherein the thin wall tube has an interior finish with an average roughness of less than 10 µm, less than 5 µm, or less than 2 µm.

B9. The method of any of paragraphs B1-B8, wherein the filling includes sealing an end of the thin wall tube.

B10. The method of any of paragraphs B1-B9, wherein the filling includes forming seals at opposite ends of the thin wall tube with the fine particles between the seals.

B11. The method of any of paragraphs B1-B10, wherein the fine particles have an ANSI grit size of at least 80, at least 100, at least 120, at most 320, and/or at most 240.

B12. The method of any of paragraphs B1-B11, wherein the fine particles have an average particle size of less than 180 µm, less than 150 µm, less than 100 µm, greater than 30 µm, and/or greater than 50 µm.

B13. The method of any of paragraphs B1-B12, wherein the fine particles include, optionally consist essentially of, at least one of silicate, garnet, aluminum oxide, and glass.

B14. The method of any of paragraphs B1-B13, wherein the helical groove is sized to accept a portion of an outside circumference of the thin wall tube, optionally in a sliding fit.

B15. The method of any of paragraphs B1-B14, wherein the helical groove includes a semicircular profile sized to accept an outside circumference of the thin wall tube, optionally in a sliding fit.

B16. The method of any of paragraphs B1-B15, wherein the helical groove has a helix pitch of less than 4, less than 3, and/or greater than 1 times the width of the helical groove.

B17. The method of any of paragraphs B1-B16, wherein the helical groove has a helix angle of less than 80°, less than 70°, greater than 30°, greater than 45°, and/or greater than 60°.

B18. The method of any of paragraphs B1-B17, wherein the fixing includes clamping a clamping fixture around the first section of the thin wall tube.

B19. The method of any of paragraphs B1-B18, wherein the entry block includes a guide channel and a mandrel channel, wherein the guide channel is sized to fit the outside circumference of the thin wall tube and to permit the thin wall tube to slide through, the guide channel has an exit that connects with the mandrel channel, and the guide channel is configured to direct the thin wall tube into the helical groove of the helically grooved mandrel.

B19.1. The method of paragraph B19, wherein the guide channel has at least a semicircular profile, optionally a circular profile.

B19.2. The method of any of paragraphs B19-B19.1, wherein the guide channel is sized to fit an outside circumference of the thin wall tube, optionally in a sliding fit.

B19.3. The method of any of paragraphs B19-B19.2, wherein the exit of the guide channel is oriented at a/the helix angle of the helical groove when the helically grooved mandrel is in the mandrel channel.

B19.4. The method of any of paragraphs B19-B19.3, wherein the exit of the guide channel is configured to discharge the tube at a/the helix angle of the helical groove.

B19.5. The method of any of paragraphs B19-B19.4, wherein the guide channel has an entrance oriented substantially perpendicular to a helix axis of the helical groove when the helically grooved mandrel is in the mandrel channel.

B19.6. The method of any of paragraphs B19-B19.5, wherein the guide channel has an/the entrance configured to accept the thin wall tube at an angle substantially perpendicular to a/the helix axis of the helical groove.

B19.7. The method of any of paragraphs B19-B19.6, wherein the mandrel channel of the entry block is configured to fit around the helically grooved mandrel, optionally with the thin wall tube wrapped around the helically grooved mandrel within the helical groove.

B20. The method of any of paragraphs B1-B19.7, wherein the assembling includes assembling at least two entry block members around the helically grooved mandrel to form the entry block.

B21. The method of any of paragraphs B1-B20, wherein the bending includes forming at least 5, at least 10, less than 100, and/or less than 50 loops in the thin wall tube.

B22. The method of any of paragraphs B1-B21, wherein the bending includes forming the tightly-coiled helical duct with the outside diameter of the tightly-coiled helical duct being less than three times the outside diameter of the thin wall tube.

B23. The method of any of paragraphs B1-B22, wherein the bending includes maintaining an interior finish of the thin wall tube, optionally maintaining the interior finish with an average roughness of less than 50 µm, less than 20 µm, less than 10 µm, less than 5 µm, or less than 2 µm.

B24. The method of any of paragraphs B1-B23, wherein the bending includes rotating the helically grooved mandrel relative to the entry block at a substantially constant velocity, optionally to form at least 5, or at least 10 loops of the tightly-coiled helical duct.

B25. The method of any of paragraphs B1-B24, wherein the bending includes linearly translating the entry block along a helix axis of the helical groove while rotating the helically grooved mandrel relative the entry block.

B26. The method of any of paragraphs B1-B25, further comprising after the bending, unclamping the first section of the thin wall tube from the helically groove mandrel.

B27. The method of any of paragraphs B1-B26, further comprising after the bending, releasing the entry block from the tightly-coiled helical duct and the helically grooved mandrel.

B28. The method of any of paragraphs B1-B27, further comprising unthreading the tightly coiled helical duct from the helically grooved mandrel.

B28.1. The method of paragraph B28, wherein the unthreading includes applying a removal fixture to the tightly-coiled helical duct to maintain a shape of the tightly-coiled helical duct as the tightly-coiled helical duct is unthreaded.

B29. The method of any of paragraphs B1-B28.1, further comprising forming an entrance section and/or an exit section of the tightly-coiled helical duct by bending one or both end regions of the tightly-coiled helical duct into a direction substantially parallel to a helix axis of the tightly-coiled helical duct.

B30. The method of any of paragraphs B1-B29, further comprising forming a waste port in the tightly-coiled helical duct by forming an aperture through a wall of the tightly-coiled helical duct proximate to an end of a coil section of the tightly-coiled helical duct.

B31. A tightly-coiled helical duct formed by the method of any of paragraphs B1-B30.

B31.1. The tightly-coiled helical duct of paragraph B31, wherein the tightly-coiled helical duct has a wall surrounding a helical path, wherein the wall of the tightly-coiled helical duct has a helium leak rate of less than 1 mg per hour at a pressure differential of 1 bar across the wall.

B31.2. The tightly-coiled helical duct of any of paragraphs B31-B31.1, wherein the tightly-coiled helical duct is configured to produce laminar flow of gas at a gas flow rate of at least 10 m/s, at least 20 m/s, or at least 50 m/s.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B.

As used herein, the singular forms "a", "an" and "the" may be intended to include the plural forms as well, unless the context clearly indicates otherwise.

The various disclosed elements of apparatuses and steps of methods disclosed herein are not required of all apparatuses and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed apparatus or method. Accordingly, such inventive subject matter is not required to be associated with the specific systems and methods that are expressly disclosed herein, and such inventive subject matter may find utility in apparatuses and/or methods that are not expressly disclosed herein.

The invention claimed is:

1. A helical coil toolset comprising:
a helically grooved mandrel with a helical groove having a semicircular profile sized to accept an outside circumference of a tube in a sliding fit, wherein the helical groove has a helix inside diameter that is less than twice a width of the helical groove; and
an entry block with a guide channel and a mandrel channel, wherein the guide channel is sized to fit the outside circumference of the tube and to permit the tube to slide through, the guide channel has an exit that connects with the mandrel channel, the mandrel channel is configured to receive the helically grooved mandrel, the mandrel channel has a helical tube-contacting surface that extends into the helical groove of the helically grooved mandrel to engage the tube when the helically grooved mandrel is received in the mandrel channel and when the tube is positioned within the helical groove, and the guide channel is configured to direct the tube into the helical groove of the helically grooved mandrel.

2. The helical coil toolset of claim 1, wherein the helical groove has a helix pitch of less than 4 times the outside diameter of the tube.

3. The helical coil toolset of claim 1, wherein the helical groove includes at least 10 and less than 100 loops.

4. The helical coil toolset of claim 1, wherein the guide channel of the entry block has an at least semicircular profile.

5. The helical coil toolset of claim 1, wherein the exit of the guide channel is oriented at a helix angle of the helical groove when the helically grooved mandrel is in the mandrel channel.

6. The helical coil toolset of claim 1, wherein the entry block includes at least two entry block members that are configured to selectively separate to accept the helically grooved mandrel in the mandrel channel and to selectively connect around the helically grooved mandrel to form the entry block.

7. The helical coil toolset of claim 1, further comprising a clamping fixture configured to restrain the tube with respect to the helically grooved mandrel.

8. The helical coil toolset of claim 1, further comprising a removal fixture configured to maintain a tightly-coiled helical shape of a tube wrapped around the helically grooved mandrel in the helical groove as the helically grooved mandrel is unthreaded from the tube.

9. The helical coil toolset of claim 8, wherein the removal fixture includes a mandrel channel sized to fit the helically grooved mandrel and the tube wrapped around the helically grooved mandrel in the helical groove, and wherein the mandrel channel of the removal fixture includes a semicircular profile sized to accept the outside circumference of the tube.

10. The helical coil toolset of claim 1 in combination with the tube, wherein the helical groove is sized to accept a portion of the outside circumference of the tube in a sliding fit; and wherein the tube is a thin wall tube, is formed around the helically grooved mandrel, and is in the helical groove.

11. The combination of claim 10, wherein the helically grooved mandrel includes a shaft that defines the helical groove, wherein the shaft consists essentially of steel, wherein the tube consists essentially of a 3000-series alloy of aluminum.

12. The combination of claim 10, wherein the tube has an outside diameter of greater than 1 mm and less than 20 mm.

13. The combination of claim 10, wherein the tube has a wall thickness to outside diameter ratio of less than 15%.

14. The combination of claim 10, wherein the tube has an interior finish with an average roughness of less than 50 µm.

15. The combination of claim 10, wherein the tube is filled with fine particles that have an average particle size of less than 180 µm and greater than 30 µm.

16. The helical coil toolset of claim 1, wherein the helical tube-contacting surface comprises three loops.

17. A method for forming thin wall tubing into a tightly-coiled helical duct utilizing the helical coil toolset of claim 1, the method comprising:
  selecting a thin wall tube with an outside diameter and a wall thickness, wherein the outside diameter is greater than 1 mm and less than 20 mm, wherein the wall thickness is less than 15% of the outside diameter;
  filling the thin wall tube with fine particles to form a filled tube;
  positioning a portion of the thin wall tube in the helical groove of the helically grooved mandrel;
  fixing a first section of the thin wall tube relative to the helically grooved mandrel, wherein the first section is proximate to the portion of the thin wall tube in the helical groove;
  assembling the entry block around a second section of the thin wall tube and around the helically grooved mandrel, wherein the portion of the thin wall tube in the helical groove is between the first section and the second section of the thin wall tube; and
  bending the filled tube around the helically grooved mandrel by rotating the helically grooved mandrel relative to the entry block assembled around the thin wall tube and helically grooved mandrel, wherein the bending includes forming a tightly-coiled helical duct within the helical groove from the thin wall tube with an outside diameter of the tightly-coiled helical duct that is less than four times the outside diameter of the thin wall tube.

18. The method of claim 17, wherein the fine particles have an average particle size of less than 180 µm and greater than 30 µm, and wherein the bending includes maintaining an interior finish of the thin wall tube with an average roughness of less than 50 µm.

19. The method of claim 17, further comprising unthreading the tightly-coiled helical duct from the helically groove mandrel, wherein the unthreading includes applying a removal fixture to the tightly-coiled helical duct to maintain a shape of the tightly-coiled helical duct as the tightly-coiled helical duct is unthreaded.

20. The method of claim 17, further comprising forming a waste port in the tightly-coiled helical duct by forming an aperture through a wall of the tightly-coiled helical duct proximate to an end of a coil section of the tightly-coiled helical duct.

* * * * *